US011182004B2

(12) United States Patent
Minami et al.

(10) Patent No.: US 11,182,004 B2
(45) Date of Patent: Nov. 23, 2021

(54) CHANGING SENSING AREAS BASED ON START POSITIONS OF TOUCH GESTURES

(71) Applicant: SEIKO EPSON CORPORATION, Tokyo (JP)

(72) Inventors: Takeshi Minami, Matsumoto (JP); Yasutaka Shibagaki, Cibatu Cikarang Selatan (ID); Toshifumi Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/817,169

(22) Filed: Mar. 12, 2020

(65) Prior Publication Data

US 2020/0293138 A1 Sep. 17, 2020

(30) Foreign Application Priority Data

Mar. 13, 2019 (JP) .............................. JP2019-045517

(51) Int. Cl.
*G06F 3/041* (2006.01)
*G06F 3/12* (2006.01)

(52) U.S. Cl.
CPC .......... *G06F 3/0412* (2013.01); *G06F 3/0414* (2013.01); *G06F 3/1279* (2013.01)

(58) Field of Classification Search
None
See application file for complete search history.

(56) References Cited

U.S. PATENT DOCUMENTS

2005/0156904 A1* 7/2005 Katayose ................ G06F 3/016
345/173
2014/0192004 A1* 7/2014 Andersson ............ G06F 3/0488
345/173

FOREIGN PATENT DOCUMENTS

JP      09062446 A  *  3/1997
JP      2006-133887     5/2006

OTHER PUBLICATIONS

English Translation of Japanese Patent Application H07-213423, corresponding to Japanese Publication 9-62446. (Year: 1995).*

* cited by examiner

*Primary Examiner* — Thomas D Lee
(74) *Attorney, Agent, or Firm* — Workman Nydegger

(57) ABSTRACT

A printing apparatus includes a controller that determines that the button is operated according to the second operation in which the operation tool leaves the button following the first operation in which the operation tool moves to the button being operated, and determines that the button is not operated according to the third operation in which the operation tool leaves the button following the first operation being operated. The controller makes a determination of the second operation and the third operation according to the operation description before the first operation.

8 Claims, 17 Drawing Sheets

FIG. 4
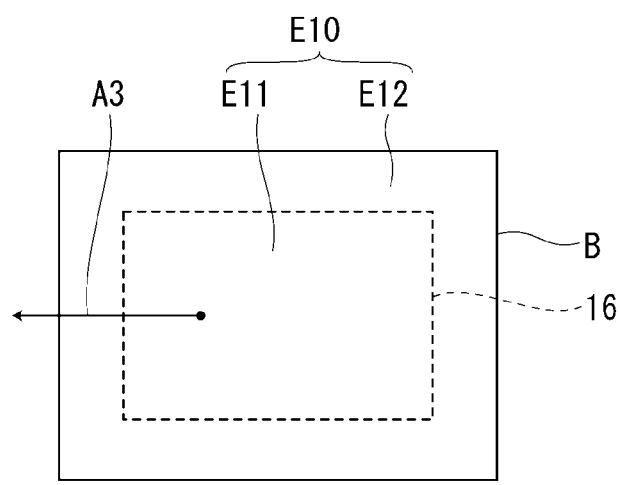
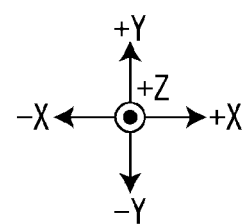

FIG. 5
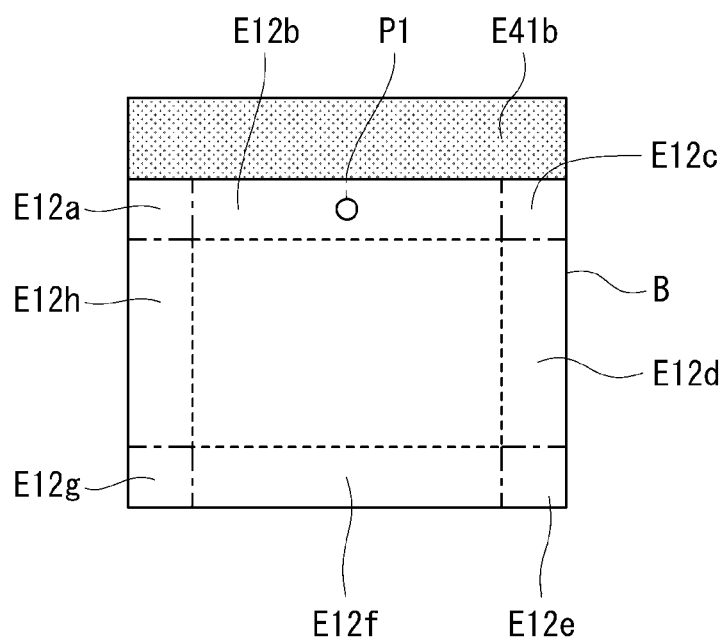
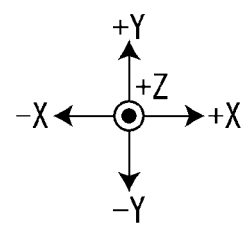

FIG. 6
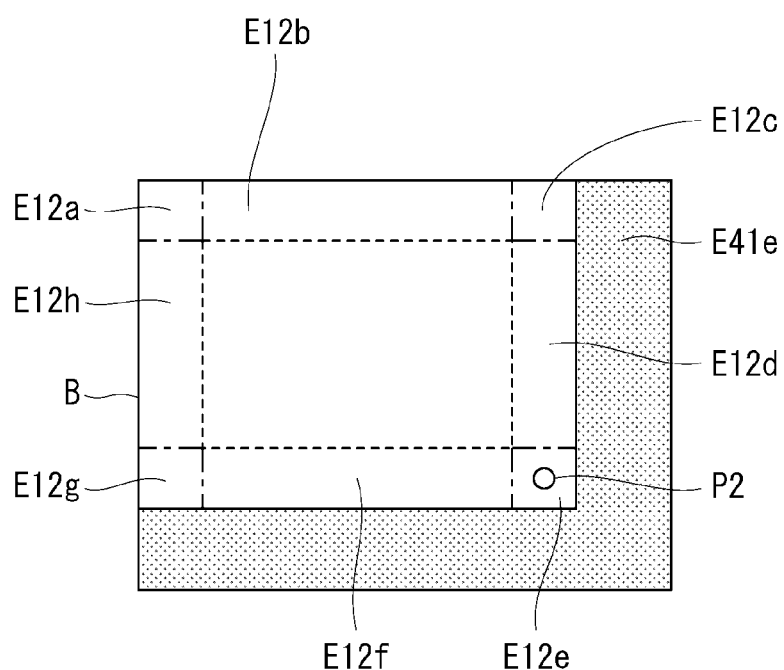
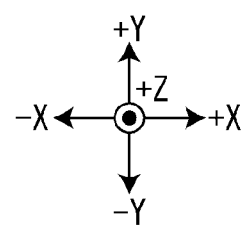

FIG. 7
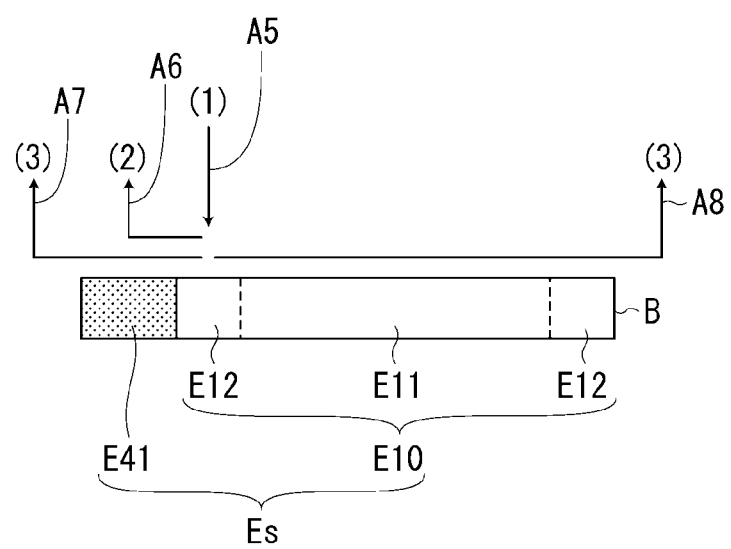
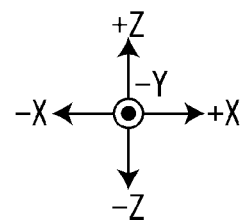

FIG. 8
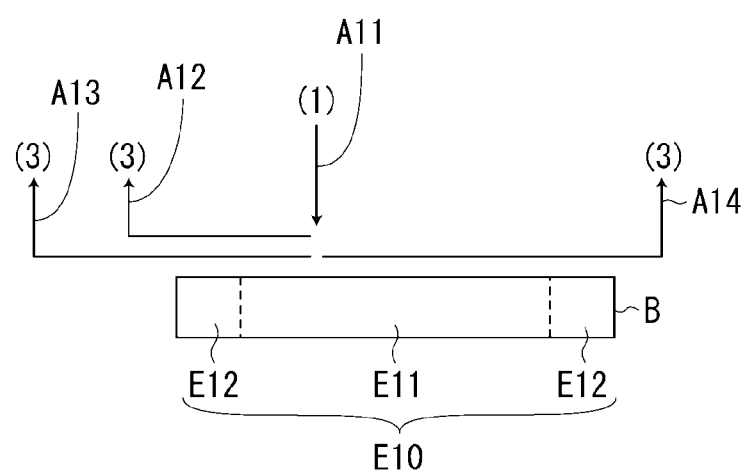
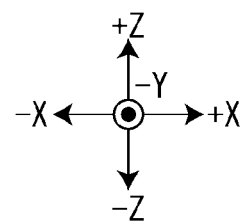

FIG. 10
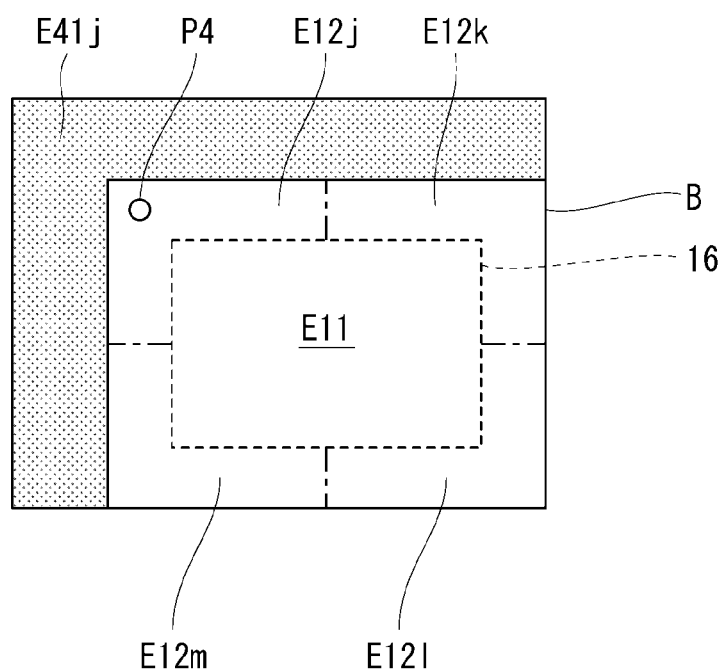
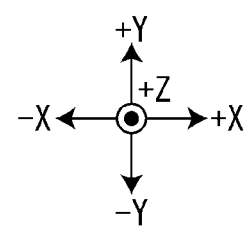

FIG. 11
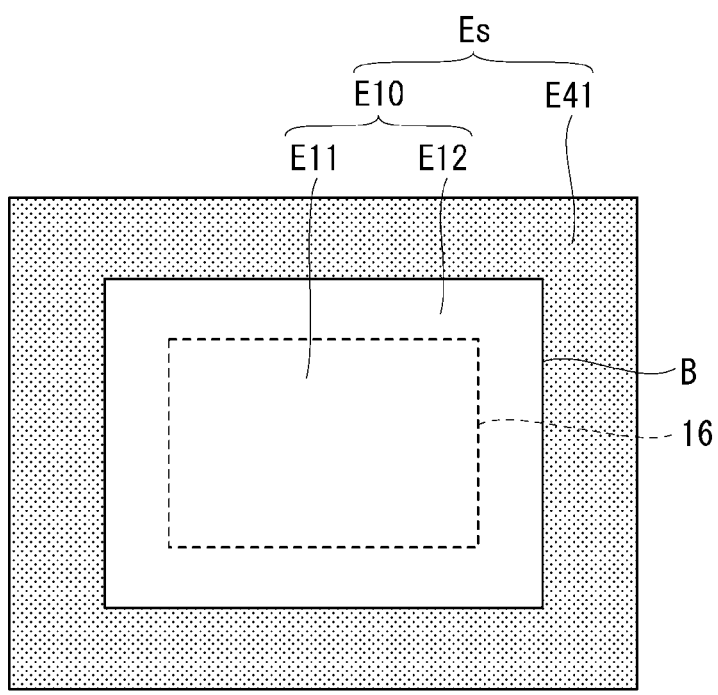
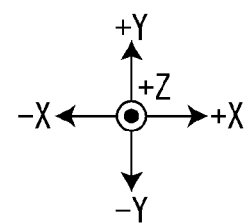

FIG. 12
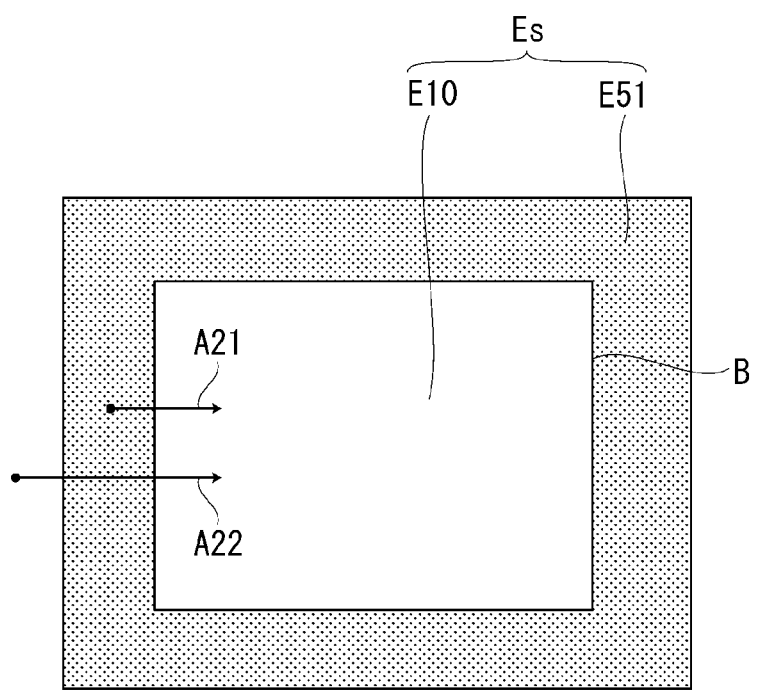
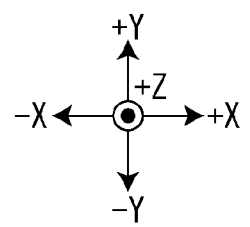

FIG. 13
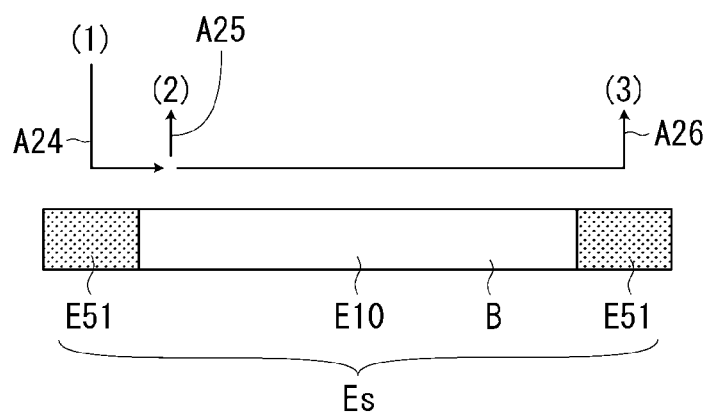
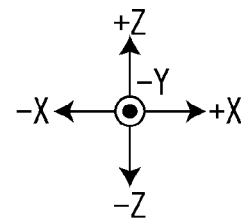

FIG. 14
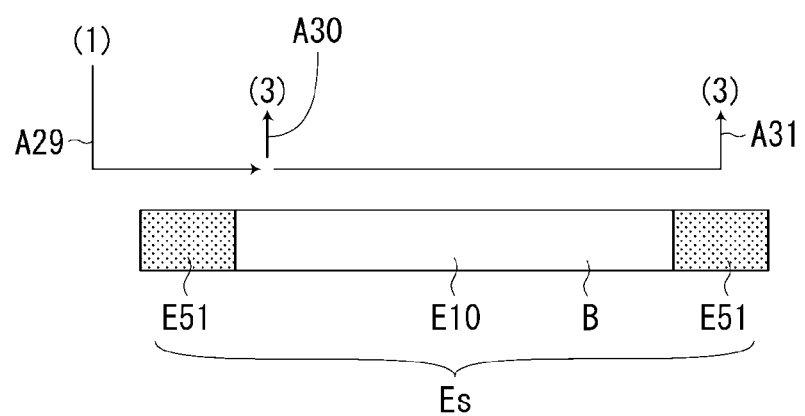
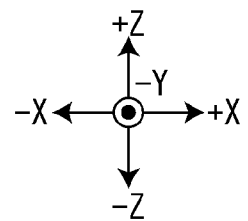

US 11,182,004 B2

CHANGING SENSING AREAS BASED ON START POSITIONS OF TOUCH GESTURES

The present application is based on, and claims priority from JP Application Serial Number 2019-045517, filed Mar. 13, 2019, the disclosure of which is hereby incorporated by reference herein in its entirety.

BACKGROUND

1. Technical Field

The present disclosure relates to an electronic device and a program.

2. Related Art

JP A-2006-133887 discloses a technique in which a malfunction caused by a position of a finger being shifted when the end of a button is touched is prevented by expanding the sensing area at which that the button is touched is detected rather than the actual display area of the button when a touch on the button is detected. In addition, the operation of canceling the button operation may be performed by releasing the finger after touching the button with the finger and then moving the finger outside the button.

It is desired to determine a user's operation more appropriately.

SUMMARY

According to an aspect of the present disclosure, an electronic device includes a display unit that displays a button, a determination unit that determines that according to a second operation in which an operation tool leaves the button being operated following a first operation in which the operation tool moves toward the button, the button is operated, and determines that according to a third operation in which the operation tool leaves the button being operated following the first operation, the button is not operated, and a decision unit that makes a decision of a criterion for determining the second operation and the third operation according to an operation description before the first operation.

According to an aspect of the present disclosure, a non-transitory computer-readable storage medium stores a program. The program causes an electronic device including a display unit displaying a button to execute a method. The method includes determining that according to a second operation in which an operation tool leaves the button being operated following a first operation in which the operation tool moves toward the button, the button is operated, and determining that according to a third operation in which the operation tool leaves the button being operated following the first operation, the button is not operated, and making a decision of a criterion for determining the second operation and the third operation according to an operation description before the first operation.

BRIEF DESCRIPTION OF THE DRAWINGS

FIG. 4 is a diagram illustrating an example of an operation on a button arranged on the XY plane.

FIG. 5 is an explanatory diagram showing a method of setting a sensing area.

FIG. 6 is an explanatory diagram showing a method of setting a sensing area.

FIG. 7 is a diagram illustrating an example of an operation on a button when viewed from the −Y direction.

FIG. 8 is a diagram illustrating an example of an operation on a button when viewed from the −Y direction.

FIG. 10 is an explanatory diagram showing a method of setting a sensing area for a button arranged on the XY plane according to Modification 1-1.

FIG. 11 is an explanatory diagram illustrating a method of setting a sensing area for a button arranged on the XY plane according to Modification 1-2.

FIG. 12 is a diagram illustrating an example of an operation on a button arranged on the XY plane according to a second embodiment.

FIG. 13 is a diagram illustrating an example of an operation on a button when viewed from the −Y direction according to the second embodiment.

FIG. 14 is a diagram illustrating an example of an operation on a button when viewed from the −Y direction according to the second embodiment.

DESCRIPTION OF EXEMPLARY EMBODIMENTS

First Embodiment

Figure 1:
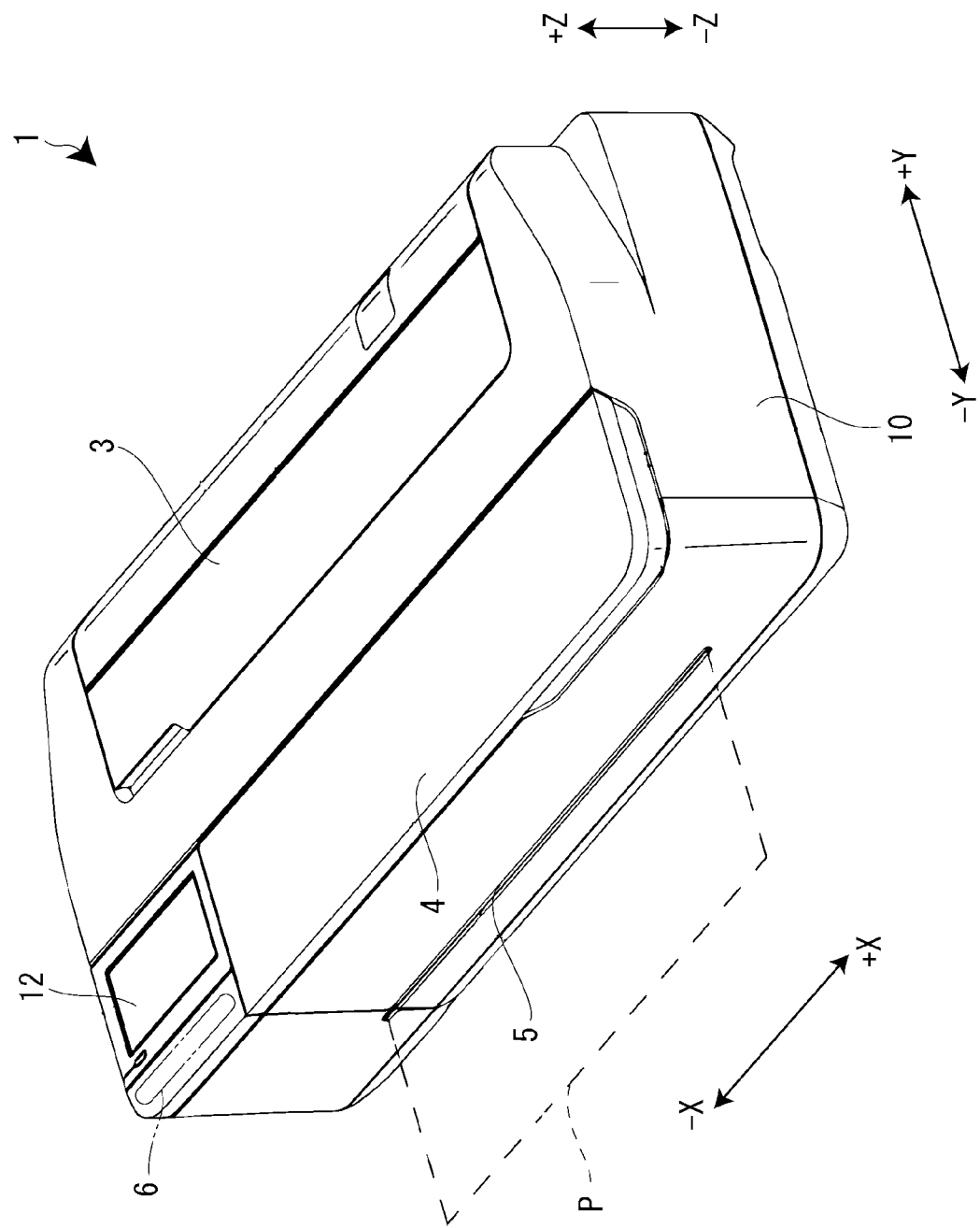
FIG. 1 is an external perspective view of a printing apparatus.

Hereinafter, an electronic device and a program according to an embodiment will be described with reference to the accompanying drawings. FIG. 1 is an external perspective view of a printing apparatus 1 that is an example of an "electronic device". The printing apparatus 1 includes a substantially rectangular parallelepiped housing 10. A paper feed cover 3 positioned in the +Y direction and a maintenance cover 4 positioned in the −Y direction are openably and closably provided on the upper face that is the face, in the +Z direction, of the housing 10. Further, a discharge port 5 through which the printed paper P is discharged is provided on the front face that is the face, in the −Y direction, of the housing 10.

An operation panel 12 for performing various operations of the printing apparatus 1 is provided at a position adjacent to the maintenance cover 4 on the upper face of the housing 10 in the −X direction. The operation panel 12 is provided so as to be rotatable about a rotation shaft 6, and the posture can be changed between a tilted posture shown in FIG. 1 and a standing posture (not shown). In the following description, it is assumed that the operation panel 12 is used in a tilted posture.

Figure 2:
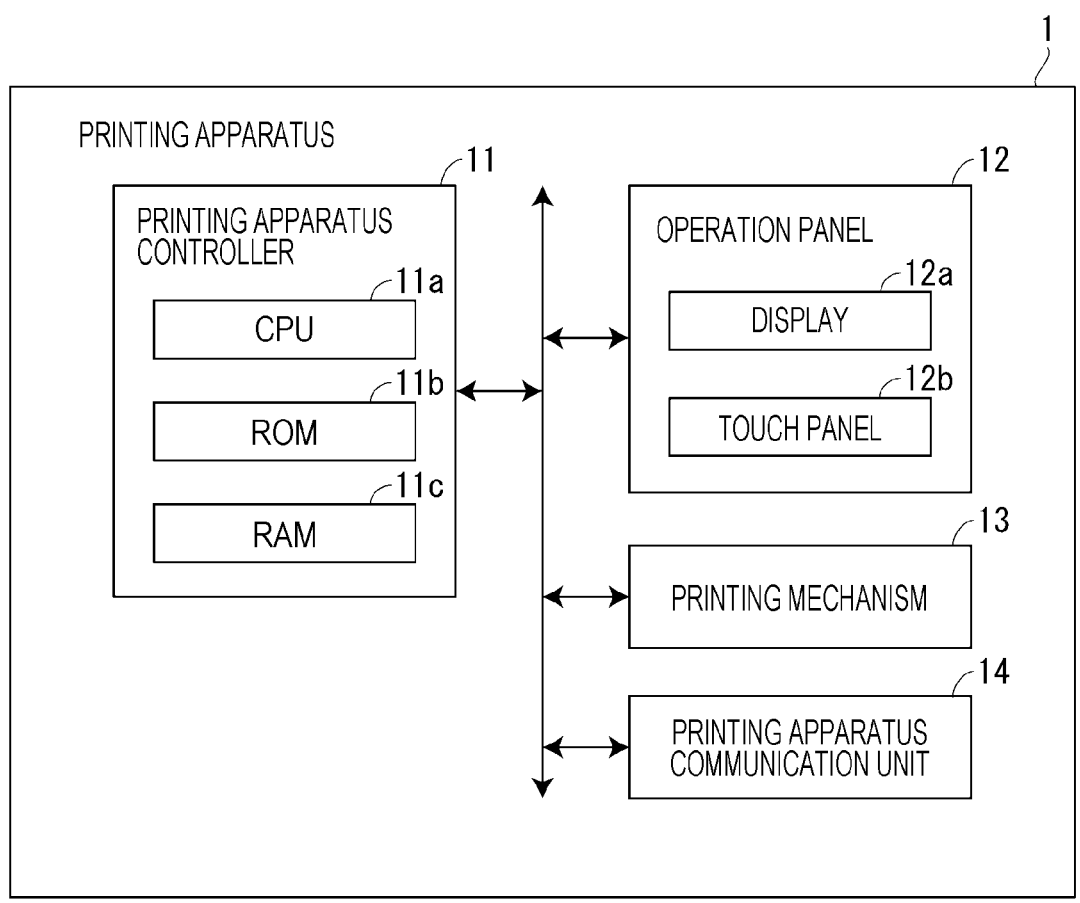
FIG. 2 is a block diagram illustrating a control configuration of the printing apparatus.

Next, the control configuration of the printing apparatus 1 will be described with reference to FIG. 2. The printing apparatus 1 includes a printing apparatus controller 11, the operation panel 12, a printing mechanism 13, and a printing apparatus communication unit 14. The printing apparatus controller 11 is an example of a "determination unit" and a "decision unit".

The printing apparatus controller 11 includes a central processing unit (CPU) 11a, a read only memory (ROM) 11b, and a random access memory (RAM) 11c. The CPU 11a controls respective units in the printing apparatus 1 by developing the control program stored in the ROM 11b in the RAM 11c and executing the program. The control program is an example of a "program".

The printing apparatus controller 11 may include a processor other than the CPU 11a. The processor may be configured by a hardware circuit such as an application specific integrated circuit (ASIC). The processor may be configured such that one or more CPUs and the hardware circuit such as the ASIC operate in cooperation.

The operation panel 12 is a device that combines a display 12a and a touch panel 12b. The display 12a and the touch panel 12b are provided along the XY plane in the tilted posture. The display 12a is an example of a "display unit". The display 12a displays various operation screens based on display control by the printing apparatus controller 11. The touch panel 12b outputs an operation signal based on an operation of a user to the printing apparatus controller 11. In the present embodiment, the printing apparatus controller 11 displays an operation screen including a button B (see FIG. 3 and the like) on the display 12a. Further, the printing apparatus controller 11 detects the operation by the user on the button B using the touch panel 12b.

The operation method of the touch panel 12b is not particularly limited, but may include a resistive film method, a capacitance method, an electromagnetic induction method, an infrared method, a surface acoustic wave method, or the like. In addition, an operation tool for performing an operation on the touch panel 12b may be any one corresponding to each operation method, and may be a user's finger or pen, and not particularly limited.

The printing mechanism 13 is a printer engine that performs printing on the paper P (see FIG. 1). For example, when the printing apparatus 1 is an ink jet printer, the printing mechanism 13 includes an ink jet head, a head drive mechanism, a print medium transport mechanism, and the like. The printing apparatus communication unit 14 communicates with a host device and receives print data from the host device. The printing apparatus controller 11 controls the printing mechanism 13 based on the print data received from the host device and performs printing on the paper P.

With the above configuration, the printing apparatus controller 11 serves as a determination unit that determines that according to a second operation in which an operation tool such as a finger, a pen, or the like leaves the button B being operated following a first operation in which the operation tool moves toward the button B, the button B is operated, and determines that according to a third operation in which the operation tool leaves the button B being operated following the first operation, the button B is not operated, and a decision unit that makes a decision of a criterion for determining the second operation and the third operation according to an operation description before the first operation.

Here, the first operation is an operation in which the operation tool moves from the direction in which the user is present (the +Z direction in FIG. 3 and the like) toward the XY plane on which the button B is arranged. The second operation and the third operation are operations in which the operation tool moves from the XY plane toward the direction in which the user is present. Among these, the second operation is an operation in which the operation tool moves from a sensing area Es including an in-button area E10 (see FIG. 3 and the like) which is an area in the button B toward the direction in which the user is present. The XYZ axes shown in FIG. 3 and the like will be described assuming that the X axis, the Y axis, and the Z axis are orthogonal to each other, but the term "orthogonal" may not be the orthogonal state in the strict sense. It may be a state in which the three axes intersect to each other.

The printing apparatus controller 11 decides the size of the sensing area Es according to the operation description before the first operation. More specifically, the printing apparatus controller 11 decides the size of the sensing area Es so that the size of the sensing area Es when the first operation is an operation in which the operation tool moves toward an in-button end area E12 (see FIG. 3 and the like) which is an area that is the in-button area E10 which is outside the in-button central area E11, where the in-button central area E11 is the central area of the in-button area E10, is larger than that when the first operation is an operation in which the operation tool moves toward the in-button central area E11. In the present embodiment, the size of the sensing area Es is decided by additionally setting a second sensing area E41 in the in-button area E10. Hereinafter, a method of determining the button operation and a method of setting the second sensing area E41 by the printing apparatus controller 11 will be described in detail.

Figure 3:
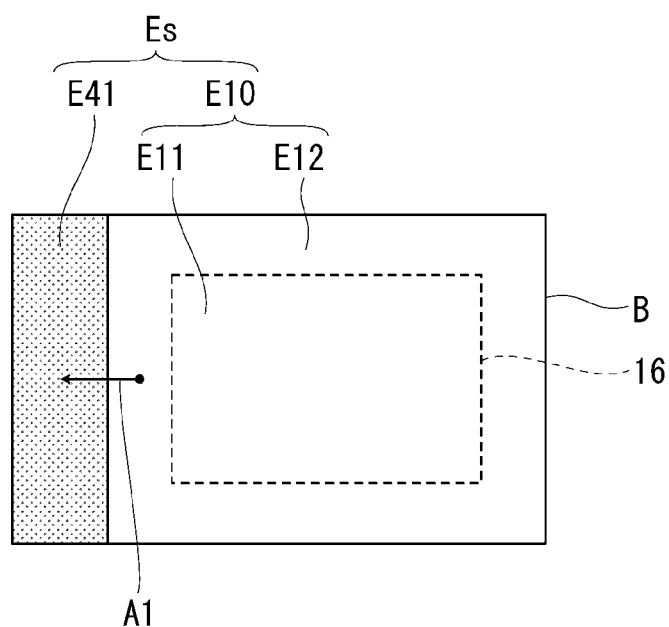
FIG. 3 is a diagram illustrating an example of an operation on a button arranged on the XY plane.

FIGS. 3 to 6 show the button B displayed on the display 12a of the operation panel 12. The display 12a of the operation panel 12 displays the XY plane in these drawings. As shown in FIG. 3 and the like, the in-button area E10 that is an area in the button B arranged on the XY plane includes an in-button central area E11 that is the central area of the in-button area E10 and the in-button end area E12 which is a peripheral area of the in-button central area E11. In the present embodiment, it is assumed that the in-button area E10 and the in-button central area E11 are rectangular areas. In FIG. 3 and the like, the broken line 16 indicates a boundary between the in-button central area E11 and the in-button end area E12 for the sake of explanation, and it may not be actually displayed on the display 12a.

As shown by the arrow A1 in FIG. 3, when the touch start position on the button B of the user is located in the in-button end area E12, the printing apparatus controller 11 decides the sensing area Es by setting the second sensing area E41. The start point of the arrow A1 indicates the touch start position, and the end point indicates the touch release position. The same applies to the arrow A3 shown in FIG. 4. The sensing area Es is an area where the printing apparatus controller 11 senses that the button B is touched. When the second sensing area E41 is set, the sensing area Es includes a first sensing area corresponding to the in-button area E10 and the second sensing area E41.

In this way, when the touch start position of the user is located in the in-button end area E12, the printing apparatus controller 11 prevents the malfunction when the touch position is blurred by setting the second sensing area E41, and expanding the sensing area Es. In other words, as shown by arrow A1, since the touch end position is located in the sensing area Es even when the touch position is unintentionally shifted out of the button B after the user touches the button B, the printing apparatus controller 11 determines that the button B is operated.

On the other hand, as shown by the arrow A3 in FIG. 4, when the touch start position of the user is located in an in-button central area E11, the printing apparatus controller 11 does not set the second sensing area E41. For this reason, when the operation of the arrow A3 is performed, the printing apparatus controller 11 determines that the button B is not operated because the touch release position is not located in the sensing area Es although the position of the operation of the arrow A1 in FIG. 3 and the touch release position are the same. As a result, when the user intentionally shifts the touch position out of the button B and cancel the button operation after the user touches the button B, the operation result desired by the user can be obtained.

When the touch start position of the user is located in the in-button end area E12, the printing apparatus controller 11 sets the second sensing area E41 at a different position according to the touch start position. FIGS. 5 and 6 are explanatory diagrams showing a method of setting the sensing area Es. In this embodiment, the printing apparatus controller 11 sets the second sensing area E41 at a different position depending on which area the touch start position is located in among partition areas E12a to E12h that are obtained by dividing the in-button end area E12 into eight areas. The partition areas E12a to E12h are areas that are partitioned by extending each side constituting the in-button central area E11 to each side constituting the in-button area E10.

As shown in FIG. 5, for example, when the touch start position of the user is the position P1 in the partition area E12b, the printing apparatus controller 11 sets a second sensing area E41b corresponding to the partition area E12b. That is, when the touch start position of the user is located in any of the partition area E12b, the partition area E12d, the partition area E12f, and the partition area E12h, the printing apparatus controller 11 sets, as the second sensing area E41, a rectangular area that corresponds to a movement locus when a side, of the sides constituting the in-button area E10, that overlaps a side constituting a partition area including the touch start position is translated outside the in-button area E10. The movement length by which the side is translated is a fixed length.

In addition, as shown in FIG. 6, for example, when the touch start position of the user is the position P2 in the partition area E12e, the printing apparatus controller 11 sets a second sensing area E41e corresponding to the partition area E12e. That is, when the touch start position of the user is located in any of the partition area E12a, the partition area E12c, the partition area E12e, and the partition area E12g, the printing apparatus controller 11 sets, as the second sensing area E41, an L-shaped area including two rectangular areas that correspond to movement loci when two sides, of the sides constituting the in-button area E10, that overlaps sides constituting a partition area including the touch start position are translated outside the in-button area E10, and a square area having vertexes which are contact points of the two rectangular areas.

FIGS. 7 and 8 are diagrams illustrating an example of an operation on the button B when viewed from the −Y direction. In both figures, the +Z direction is an example of the "direction in which the user is present". The arrow "A*" indicates a user operation, in other words, a movement of the operation tool operated by the user. For example, the arrow A5 in FIG. 7 indicates an operation in which the operation tool moves from the direction in which the user is present toward the button B, that is, an operation in which the user touches the button B. In the following description, an operation in which the operation tool moves from the direction in which the user is present toward the button B is simply referred to as "touch". Conversely, an operation in which the operation tool moves from the button B to the direction in which the user is present is simply referred to as "cancel touch".

In both figures, "(1)", "(2)", and "(3)" indicate an example of "a first operation", "a second operation", and "a third operation", respectively. In both figures, it is assumed that the touch movement on the touch panel 12b is performed only in the X axis direction and not performed in the Y axis direction. In FIG. 7, it is assumed that the partition area E12h of the eight partition areas shown in FIG. 5 is touched, and the second sensing area E41 is set on the −X side of the in-button area E10.

As indicated by the arrow A5 in FIG. 7, when the in-button end area E12 is touched, the printing apparatus controller 11 sets the second sensing area E41. For this reason, when the touch is released after the touch position is moved to the second sensing area E41 while being touched as indicated by the arrow A6 following the operation of the arrow A5, the printing apparatus controller 11 determines that the button B is operated. "Moving the touch position while being touched" means moving the operation tool in the X direction. On the other hand, as shown by the arrow A11 in FIG. 8, the printing apparatus controller 11 does not set the second sensing area E41 when the in-button central area E11 is touched. For this reason, when the touch is released after the touch position is moved to the place where the touch is released with the arrow A6, that is, the place where the second sensing area E41 may be set, while being touched, as indicated by the arrow A12, following the operation of the arrow A11, the printing apparatus controller 11 determines that the button B is not operated.

In this way, even when the touch is released at the same position, the printing apparatus controller 11 determines that the button B is operated when the operations of arrow A5 and arrow A6 are performed, and determines that the button B is not operated when the operations of the arrow A11 and the arrow A12 are performed, because the touch positions are different. That is, the printing apparatus controller 11 makes a decision of the criterion for determining the operation of the arrow A6 and the arrow A12 as the "second operation" which is an operation in which it is determined that the button B is operated, or as the "third operation" which is an operation in which it is determined that the button B is not operated according to the operation description of the "first operation" that is an operation when the button B is touched.

The printing apparatus controller 11 makes, depending on the position where the touch is released, the same determination on whether the button B is operated even when the touched positions differ. For example, as shown in FIG. 7, when the touch is released after the touch position is moved to an area outside the second sensing area E41, that is, an area outside the sensing area Es, while being touched, as indicated by the arrow A7, following the operation of the arrow A5, the printing apparatus controller 11 determines that the button B is not operated. Similarly, as shown in FIG. 8, when the touch is released after the touch position is moved to the position same as that of the operation of the arrow A7 while being touched as indicated by the arrow A13 following the operation of the arrow A11, the printing apparatus controller 11 determines that button B is not operated. On the other hand, when the finger is released in the Z direction after the operation of the arrow A5 or the operation of the arrow A11, it is determined that the button B is operated.

In addition, as shown in FIG. 7, when the touch is released after the touch position is moved to the area outside the in-button area E10 while being touched as indicated by the arrow A8 following the operation of the arrow A5, the printing apparatus controller 11 determines that the button B is not operated. This is because when the touch position is located in the partition area E12h, the second sensing area E41 is set only on the −X side of the in-button area E10 and not on the +X side. Similarly, as shown in FIG. 8, when the touch is released after the touch position is moved to the area outside the in-button area E10 while being touched as indicated by the arrow A14 following the operation of the arrow A11, the printing apparatus controller 11 determines that the button B is not operated. The operations of the arrow A8 and the arrow A14 are an example of the "operation in which the operation tool moves in a direction orthogonal to the direction in which the user is present from the in-button area".

Although not specifically shown, when the touch is released after the touch position is moved to any position in the in-button area E10 while being touched following the operation of the arrow A5 or the arrow A11, the printing apparatus controller 11 determines that the button B is operated. The printing apparatus controller 11 also determines that the button B is operated when the touch is released without moving the touch position following the operation of the arrow A5 or the arrow A11. The operation of releasing the touch in this case is an example of an "operation in which the operation tool moves from the in-button area to the direction in which the user is present".

Figure 9:
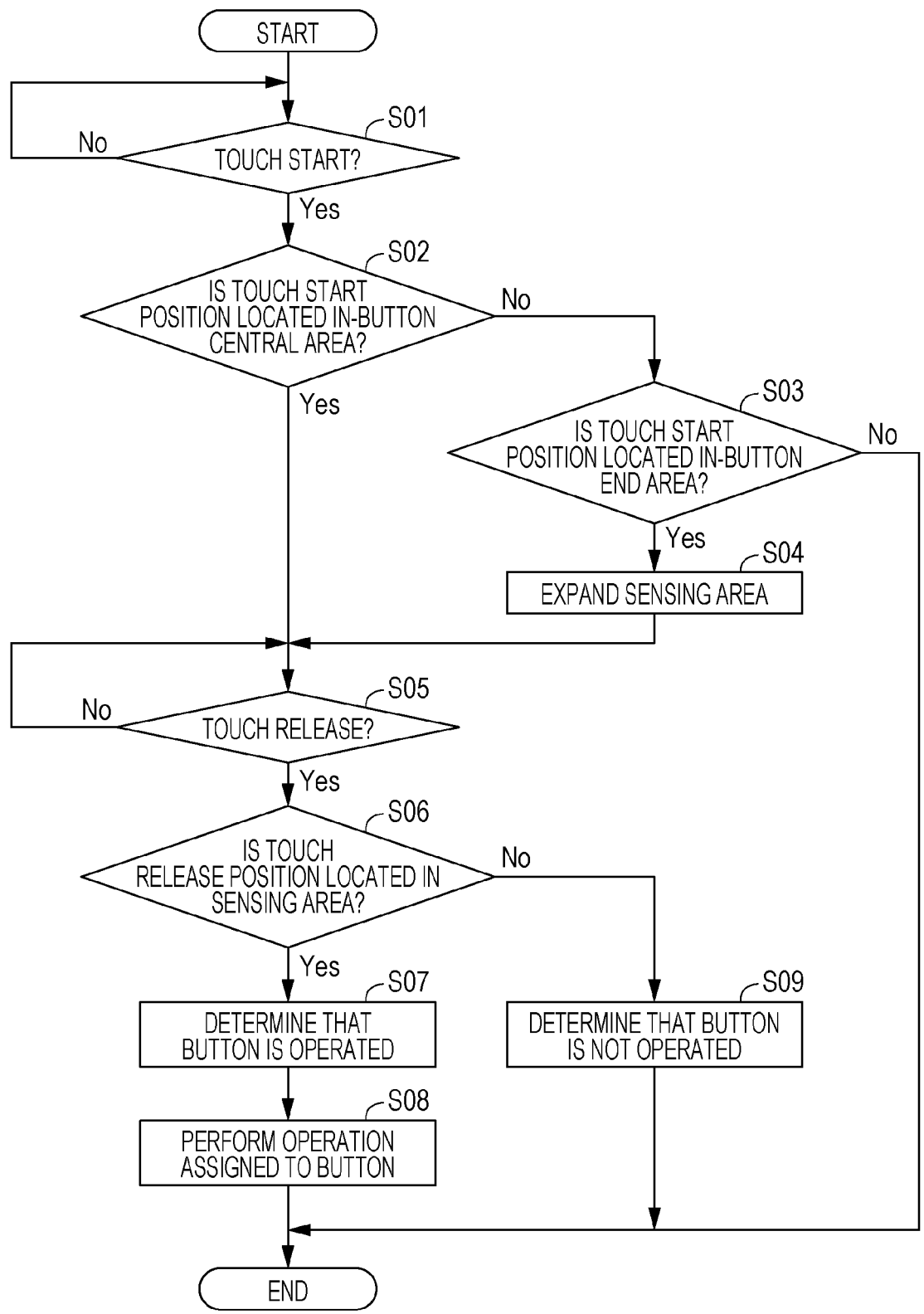
FIG. 9 is a flowchart illustrating a flow of a button operation process in a printing apparatus.

FIG. 9 is a flowchart showing the flow of the button operation process in the printing apparatus 1. The printing apparatus controller 11 determines whether the touch on the touch panel 12b is started (S01), and when determining that the touch is not started (S01: No), the printing apparatus controller 11 waits until the touch is started. When determining that the touch is started (S01: Yes), the printing apparatus controller 11 determines whether the touch start position is located in the in-in-button central area E11 (S02). When determining that the touch start position is not located in the in-button central area E11 (S02: No), the printing apparatus controller 11 determines whether the touch start position is located in the in-button end area E12 (S03).

When the printing apparatus controller 11 determines that the touch start position is not located in the in-button end area E12 (S03: No), the button operation process is ended. When determining that the touch start position is located in the in-button end area E12 (S03: Yes), the printing apparatus controller 11 expands the sensing area Es by setting the second sensing area E41 according to the touch start position (S04). After S04, and when determining that the touch start position is located in the in-button central area E11 (S02: Yes), the printing apparatus controller 11 determines whether the touch is released (S05). When determining that the touch is not released (S05: No), the printing apparatus controller 11 waits until the touch is released. When determining that the touch is released (S05: Yes), the printing apparatus controller 11 determines whether the touch release position is located in the sensing area Es (S06).

When determining that the touch release position is located in the sensing area Es (S06: Yes), the printing apparatus controller 11 determines that the button B is operated (S07), and performs the operation assigned to the button B (S08). When determining that the touch release position is not located in the sensing area Es (S06: No), the printing apparatus controller 11 determines that the button B is not operated (S09), and ends the button operation process without performing the operation assigned to the button B.

As explained above, the printing apparatus 1 according to the first embodiment makes a decision of the criteria for determining the second operation and the third operation that are operations at the time of touch release according to the operation description of the first operation that is an operation at the time of touch start. More specifically, the printing apparatus 1 sets the second sensing area E41 when the first operation is performed on the in-button end area E12, and does not set the second sensing area E41 when the first operation is performed on the in-button central area E11.

For this reason, for example, even when the touch position is unintentionally shifted outside the in-button area E10 after the user touches the in-button end area E12 which is the end of the button B, the touch end position is located in the sensing area Es, so that the printing apparatus 1, can appropriately determine that the button B is operated. In addition, since it is difficult to assume that the touch position shifts from the in-button central area E11 to the outside of the in-button area E10, the second sensing area E41 is not set in this case. As a result, the operation result desired by the user can be achieved by allowing the operation of the button B to be canceled by shifting the touch position outside the in-button area E10 after the user touches the in-button central area E11.

In the first embodiment, the following modifications can be employed.

Modification 1-1

In the above embodiment, the printing apparatus controller 11 sets the second sensing area E41 at a different position depending on which area the touch start position is located in among partition areas E12a to E12h that are obtained by dividing the in-button end area E12 into eight areas (see FIG. 5 and the like), but the method of setting the second sensing area E41 is not limited to this. For example, as shown in FIG. 10, the second sensing area E41 may be set at a different position depending on which area the touch start position is located in among partition areas E12j to E12m that partition the in-button end area E12 into four areas. The partition areas E12j to E12m are areas partitioned by a boundary line with the in-button area E10 when the in-button end area E12 is equally partitioned into four parts in the vertical and horizontal directions. For example, when the touch start position of the user is the position P4 located in the partition area E12j, the printing apparatus controller 11 sets, as the second sensing area E41j, an L-shaped area including two rectangular areas that correspond to movement loci when two sides, of the sides constituting the in-button area E10, that overlaps sides constituting a partition area including the touch start position are translated outside the in-button area E10, and a square area having vertexes which are contact points of the two rectangular areas.

Modification 1-2

Further, the printing apparatus controller 11 may set the same second sensing area E41 regardless of which area the touch start position is located in in the in-button end area E12. For example, as shown in FIG. 11, when the touch start position is located in the in-button end area E12, the printing apparatus controller 11 may set, as the second sensing area E41, a rectangular frame area including four rectangular areas which correspond to movement loci when the four sides of the in-button area E10 are translated by the same amount, and four square areas having apexes that are the contact points of the four rectangular areas. In this case, an enlarged area obtained by enlarging the in-button area E10 at the same magnification from the center thereof is the sensing area Es.

Modification 1-3

In the above embodiment, the printing apparatus controller 11 sets the second sensing area E41 when the touch start position is located in the in-button end area E12, and does not set the second sensing area E41 when the touch start position is located in the in-button central area E11, but the size of the sensing area Es may be decided depending on the touch start position. For example, the printing apparatus controller 11 may set the second sensing area E41 so that the sensing area Es when the touch start position is located in the in-button central area E11 is narrower than that when the touch start position is located in the in-button end area E12, and wider than the in-button area E10.

Modification 1-4

In the above embodiment, the printing apparatus controller 11 makes a decision of the criterion for determining the second operation and the third operation that are operations at the time of touch release according to the operation description of the first operation that is an operation at the start of touch, but makes a decision according to the operation description of the operation performed before the first operation. In this case, it is preferable to provide a storage unit that stores the user's operation history in the printing apparatus 1. The storage unit stores, as the operation history, the shift quantity of the touch position (the shift between the touch start position and the touch release position, which may be a distance as a scalar quantity, or a vector) every time the user touches the button. For example, the printing apparatus controller 11 preferably sets the second sensing area E41 when the average value of the shift quantities of the touch position stored in the storage unit is larger than the threshold value larger than that when the average value of the deviation amounts is equal to or smaller than the threshold value. According to this configuration, the second sensing area E41 having an appropriate size can be set by learning a personal habit when the user operates the button.

Modification 1-5

In the above embodiment, the operation on the operation panel 12 provided in the printing apparatus 1 has been described. The above embodiment can also be applied to the operation on the operation panel 12 provided in an electronic device other than the printing apparatus 1. For example, the above embodiment can be applied to electronic devices such as tablet terminals and smartphones.

Second Embodiment

Next, a second embodiment will be described with reference to FIGS. 12 to 15. In the first embodiment, the case where the touch start position is located in the in-button area E10 has been described. In this embodiment, the case where the touch release position is located in the in-button area E10 will be described. Hereinafter, a description will be given focusing on differences from the first embodiment. In the present embodiment, the components similar to those in the first embodiment are denoted by the same reference numerals, and detailed description thereof is omitted. Moreover, the modification applied to the components similar to those in the first embodiment is applied similarly to this embodiment.

FIG. 12 is a diagram illustrating an example of an operation on the button B arranged on the XY plane according to the second embodiment. In this embodiment, a rectangular frame area including four rectangular areas which correspond to movement loci when the four sides of the in-button area E10 are translated by the same amount, and four square areas having apexes which are the contact points of the four rectangular areas are a third sensing area E51. The third sensing area E51 is not an area set according to the touch start position, but an area set in advance. In the present embodiment, the sensing area Es includes a first sensing area corresponding to the in-button area E10 and the third sensing area E51. That is, in the present embodiment, an enlarged area obtained by enlarging the in-button area E10 from the center at the same magnification is the sensing area Es.

In this embodiment, when the touch release position is located in the in-button area E10, the printing apparatus controller 11 senses that the button B is operated when the touch start position is located in the sensing area Es. For example, since the touch start position is located in the sensing area Es when the third sensing area E51 is touched as shown by the arrow A21, the printing apparatus controller 11 determines that the button B is operated when the touch release position is located in the in-button area E10. The start points of the arrow A21 and the arrow A22 shown in the same figure show touch start positions, and the end points show touch release positions. On the other hand, since the touch start position is located outside the sensing area Es when the outside of the third sensing area E51 is touched as shown by the arrow A22, the printing apparatus controller 11 does not determine that the button B is operated even when the touch release position is located in the in-button area E10.

FIGS. 13 and 14 are diagrams illustrating an example of an operation on the button B when viewed from the −Y direction. In both figures, "(1)", "(2)", and "(3)" indicate an example of "a first operation", "a second operation", and "a third operation", respectively. Here, it is assumed that the touch movement on the touch panel 12b is performed only in the X axis direction and is not performed in the Y axis direction.

When the touch is released as shown by the arrow A25 after the third sensing area E51 is touched and the touch position is moved to the in-button area E10 while being touched as shown by the arrow A24 in FIG. 13, the printing apparatus controller 11 determines that the button B is operated. The operation of the arrow A25 is an example of "an operation in which the operation tool moves from the in-button area to the direction in which the user is present".

On the other hand, when the touch is released as shown by the arrow A30 after the outside of the third sensing area E51 is touched, and the touch position is moved to the in-button area E10 while being touched as shown by the arrow A29 in FIG. 14, the printing apparatus controller 11 determines that the button B is not operated.

In this way, even when the touch is released at the same position, the printing apparatus controller 11 determines by the operation of the arrow A24 and the arrow A25 that the button B is operated, and determines by the operation of the arrow A29 and the arrow A30 that the button B is not operated, because the touch positions are different. That is, the printing apparatus controller 11 makes a decision of the criterion for determining the operation of the arrow A25 and the arrow A30 as the "second operation" which is an operation in which it is determined that the button B is operated, or as the "third operation" which is an operation in which it is determined that the button B is not operated according to the operation description of the "first operation" that is an operation when the button B is touched.

The printing apparatus controller 11 makes, depending on the touch release position, the same determination on whether the button B is operated even when the touch start positions differ. For example, as shown in FIG. 13, when the touch is released after the touch position is moved to the outside of the in-button area E10 while being touched as indicated by the arrow A26 following the operation of the arrow A24, the printing apparatus controller 11 determines that the button B is not operated. Similarly, as shown in FIG. 14, when the touch is released after the touch position is moved to the outside of the in-button area E10 while being touched as indicated by the arrow A31 following the operation of the arrow A29, the printing apparatus controller 11 determines that the button B is not operated. The operations of the arrow A26 and the arrow A31 are an example of "an operation in which the operation tool moves in a direction orthogonal to the direction in which the user is present from the in-button area".

Although not specifically shown, when the touch is released after the touch position is moved to any position in the in-button area E10 while being touched following the operation of the arrow A24 or the arrow A29, the printing apparatus controller 11 determines that the button B is operated.

Figure 15:
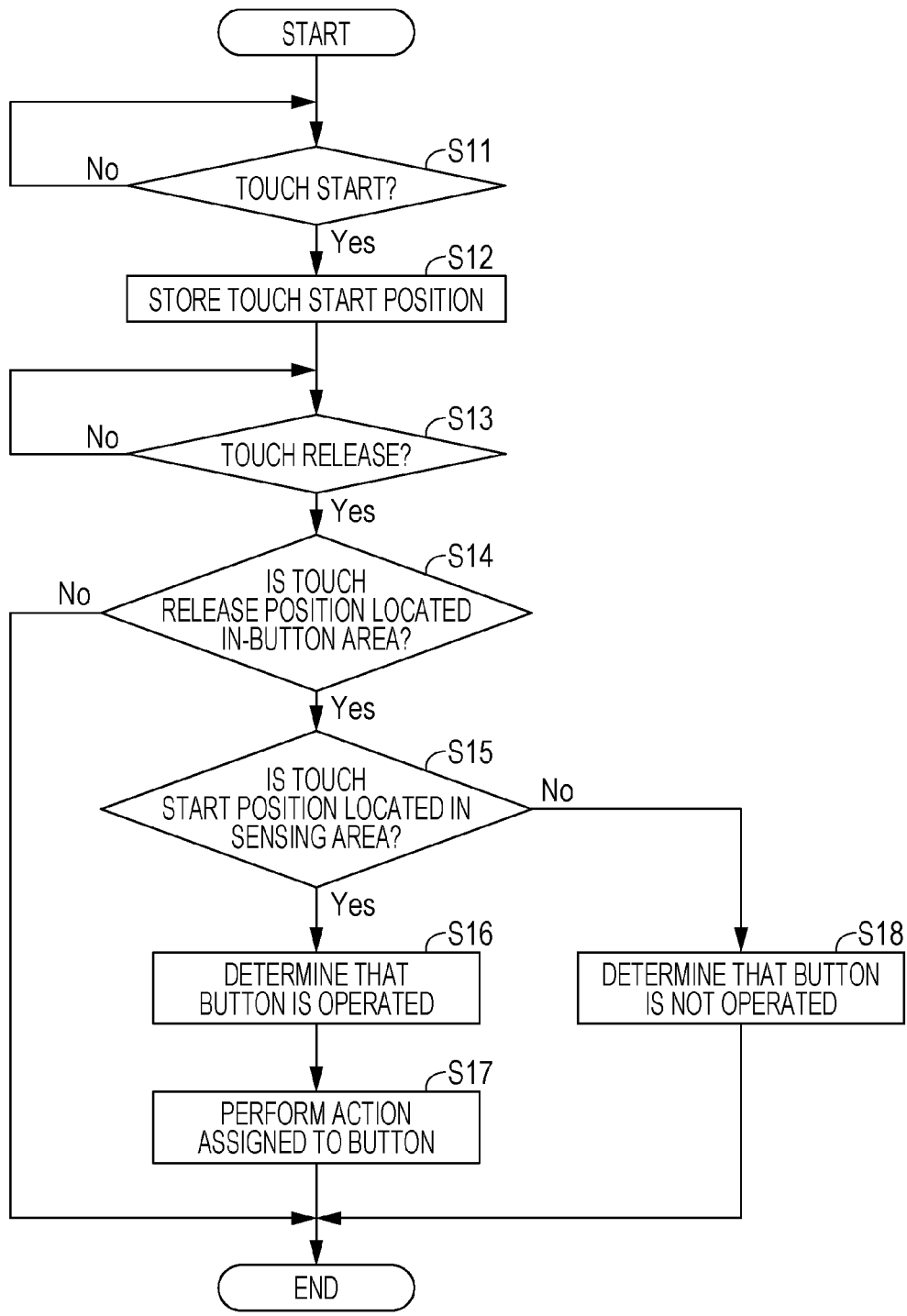
FIG. 15 is a flowchart illustrating a flow of a button operation process in a printing apparatus according to the second embodiment.

FIG. 15 is a flowchart illustrating a flow of the button operation process in the printing apparatus 1 according to the second embodiment. The printing apparatus controller 11 determines whether the touch on the touch panel 12b is started (S11), and when determining that the touch is not started (S11: No), the printing apparatus controller 11 waits until the touch is started. When determining that the touch is started (S11: Yes), the printing apparatus controller 11 stores the touch start position in, for example, a predetermined storage area in the RAM 11c (S12). The touch start position stored in the predetermined storage area is deleted when the button operation process ends.

The printing apparatus controller 11 determines whether the touch is released (S13), and when determining that the touch is not released (S13: No), the printing apparatus controller 11 waits until the touch is released. When determining that the touch is released (S13: Yes), the printing apparatus controller 11 determines whether the touch release position is located in the in-button area E10 (S14). When the printing apparatus controller 11 determines that the touch release position is not located in the in-button area E10 (S14: No), the button operation process is ended. Further, when determining that the touch release position is located in the in-button area E10 (S14: Yes), the printing apparatus controller 11 refers to a predetermined storage area in the RAM 11c, and determines whether the touch start position is located in the sensing area Es (S15).

When determining that the touch start position is located in the sensing area Es (S15: Yes), the printing apparatus controller 11 determines that the button B is operated (S16), and performs the operation assigned to the button B (S17). When determining that the touch start position is not located the sensing area Es (S15: No), the printing apparatus controller 11 determines that the button B is not operated (S18), and ends the button operation process without performing the operation assigned to the button B.

As explained above, the printing apparatus 1 according to the second embodiment decides the operation of releasing the touch from the in-button area E10 as the second operation when the first operation is an operation in which the operation tool moves toward the sensing area Es from the direction in which the user is present, that is, when the touch start position is located in the sensing area Es. On the other hand, the printing apparatus 1 decides the operation of releasing the touch from the in-button area E10 as the third operation when the first operation is an operation in which the operation tool moves toward the area outside the sensing area Es from the direction in which the user is present, that is, when the touch start position is located outside the sensing area Es. That is, when the touch start position is located in the sensing area Es and the touch release position is located in the in-button area E10, the printing apparatus 1 determines that the button B is operated. On the other hand, when the touch start position is outside the sensing area Es, the printing apparatus 1 determines that the button B is not operated even when the touch release position is located in the in-button area E10.

For this reason, even when the user touches a position slightly off the button B, the operation assigned to the button B can be performed by shifting the touch position to the in-button area E10.

In the second embodiment, the following modifications can be employed.

Modification 2-1

In the above embodiment, the printing apparatus controller 11 makes a decision of the criterion for determining the second operation and the third operation that are operations at the time of touch release according to the operation description of the first operation that is an operation at the start of touch, but makes a decision according to the operation description of the operation performed before the first operation. In this case, it is preferable to provide a storage unit that stores the user's operation history in the printing apparatus 1. The storage unit stores, as an operation history, the shift amount of the touch position when the user touches the button B. For example, the printing apparatus controller 11 preferably sets the third sensing area E51 when the average value of the shift quantities of the touch position stored in the storage unit is larger than the threshold value larger than that when the average value of the deviation amounts is equal to or smaller than the threshold value. According to this configuration, the third sensing area E51 having an appropriate size can be set by learning a personal habit when the user operates the button.

Third Embodiment

Next, a third embodiment will be described with reference to FIGS. 16 and 17. In the embodiments described above, the operation on the operation panel 12 provided in the printing apparatus 1 has been described, but the operation is not necessarily on the operation panel 12. Therefore, in the present embodiment, an operation on an operation screen displayed as a virtual image in a VR (virtual reality) device 2 will be described. The following description will focus on differences from the above embodiments. In the present embodiment, the components similar to those in the above-described embodiments are denoted by the same reference numerals, and detailed description thereof is omitted. Moreover, the modification applied to the components similar to those in the above-described embodiments is applied similarly to this embodiment.

Figure 16:
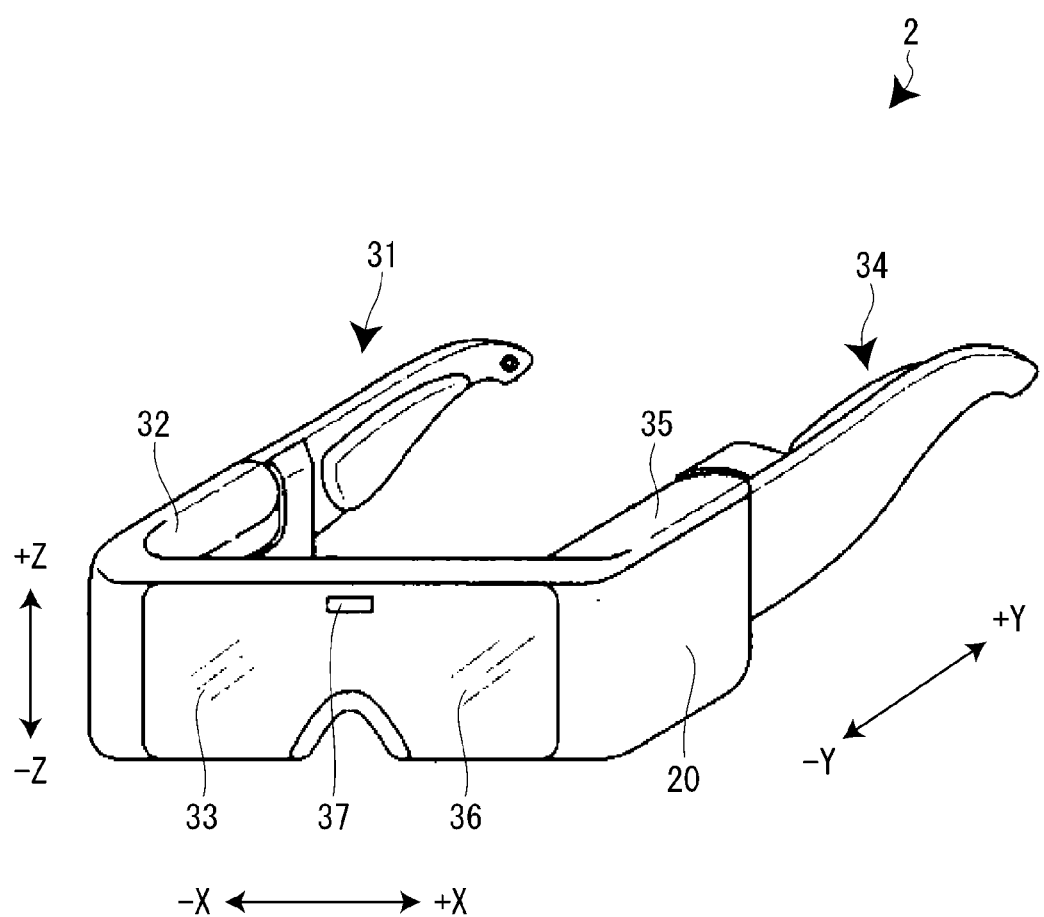
FIG. 16 is an external perspective view of a VR device according to a third embodiment.

FIG. 16 is an external perspective view of the VR device 2 according to the third embodiment. The VR device 2 is an example of an "electronic device". The XYZ axes shown in FIG. 16 are for explanation of the external configuration of the VR device 2, and do not necessarily coincide with the XYZ axes shown in the drawings of the first embodiment and the second embodiment. The VR device 2 according to the present embodiment is a see-through type head mounted display that allows a user to visually recognize a virtual image and at the same time visually recognize an outside scene. The VR device 2 includes a glasses-shaped VR main body 20. On the front face that is the face on the −Y direction side of the VR main body 20, a right display unit 33, a sensor 37, and a left display unit 36 are provided from the −X direction side. The right display unit 33 and the left display unit 36 are an example of the "display unit". In addition, a right holding unit 31 and a right display drive unit 32 are provided on the −X direction side of the VR main body 20. A left holding unit 34 and a left display drive unit 35 are provided on the +X direction side of the VR main body 20.

The +X direction side end of the right display unit 33 and the −X direction side end of the left display unit 36 are coupled at a position corresponding to the *glabella* of the user when the VR device 2 is mounted. The right holding unit 31 extends from the −X direction side end of the right display unit 33. Similarly, the left holding unit 34 extends from the +X direction side end of the left display unit 36. The right holding unit 31 and the left holding unit 34 hold the VR device 2 on the user's head like a temple of glasses.

The right display drive unit 32 is disposed on the +X direction side of the right holding unit 31, in other words, on the side facing the user's head when the VR device 2 is mounted and in the vicinity of the right display unit 33. The left display drive unit 35 is disposed on the −X direction side of the left holding unit 34 and in the vicinity of the left display unit 36. The right display drive unit 32 and the left display drive unit 35 include a transmissive liquid crystal panel that forms an image, a light source for illuminating a transmissive liquid crystal panel, and a projection optical system that projects image light emitted from the transmissive liquid crystal panel.

The right display unit 33 and the left display unit 36 are arranged at positions corresponding to before the right and left eyes of the user when the VR device 2 is mounted. The right display unit 33 and the left display unit 36 guide the image light output from the right display drive unit 32 and the left display drive unit 35, respectively, to the user's eyes while reflecting it along a predetermined optical path. The right display unit 33 and the left display unit 36 can use any method as long as a virtual image is formed before the user's eyes using image light. For example, a diffraction grating such as a hologram element may be used, or a transflective film may be used.

The sensor 37 is an imaging device arranged at a position corresponding to the *glabella* of the user when the VR device 2 is mounted. The sensor 37 captures an image of an outside scene in front of the user in a state where the VR device 2 is mounted, and images an operation tool operated by the user. In this example, one sensor 37 is illustrated, but a plurality of sensors 37 may be provided. In this example, an imaging device is illustrated as the sensor 37, but a laser sensor, an ultrasonic sensor, or the like may be used.

Figure 17:
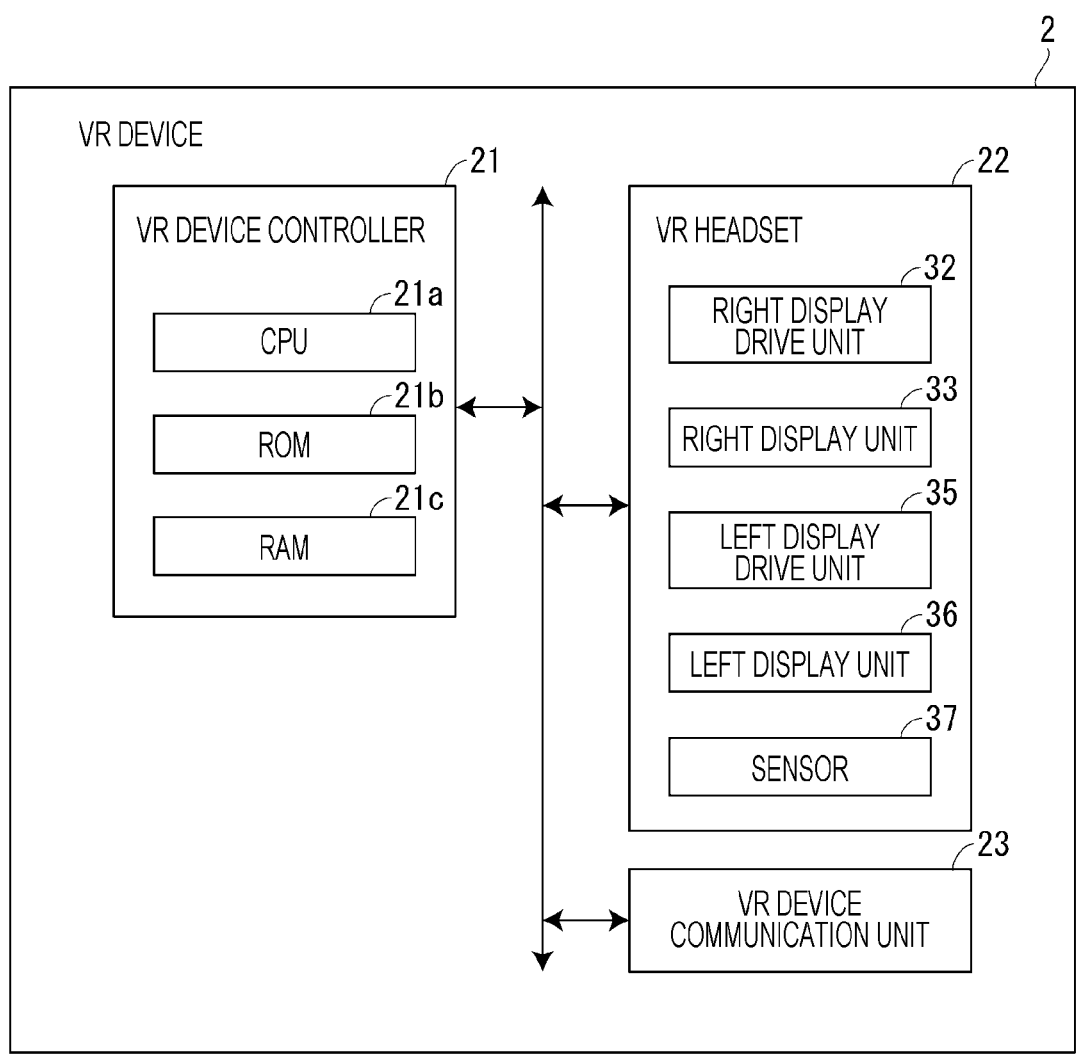
FIG. 17 is a block diagram showing a control configuration of the VR device according to the third embodiment.

FIG. 17 is a block diagram showing the configuration of the VR device 2. The VR device 2 includes a VR device controller 21, a VR headset 22, and a VR device communication unit 23. The VR device controller 21 is an example of a "determination unit" and a "decision unit".

The VR device controller 21 includes a CPU 21*a*, a ROM 21*b*, and a RAM 21*c*. The CPU 21*a* controls each part in the VR device 2 by developing the control program stored in the ROM 21*b* in the RAM 21*c* and executing the program. The control program is an example of a "program".

The VR headset 22 includes the right display drive unit 32, the right display unit 33, the left display drive unit 35, the left display unit 36 and the sensor 37. The VR device communication unit 23 communicates with the host device and receives display data from the host device. The VR device controller 21 controls the right display drive unit 32 and the left display drive unit 35 based on display data acquired from the host device, and displays a virtual image on the right display unit 33 and the left display unit 36.

With the above configuration, the VR device controller 21 generates a control signal for controlling the right display drive unit 32 and the left display drive unit 35, and displays the button B on the operation screen displayed as a virtual image. In addition, the VR device controller 21 performs image analysis on the video imaged by the sensor 37 and detects the position and the movement of the operation tool. As a result, the user can operate the button B on the operation screen displayed as a virtual image. That is, the VR device controller 21 according to the present embodiment uses the sensor 37 to detect an operation on the button B displayed as a virtual image. Further, the VR device controller 21 according to the present embodiment determines whether the button B is operated based on the detection result by the sensor 37.

As in this embodiment, when performing the operation detection for the button B displayed as a virtual image, the operation screen displayed as a virtual image is the XY plane, and the direction in which the user is present, that is, the direction of the right display unit 33 and the left display unit 36 for the operation screen is the +Z direction. In this case, the operation in which the operation tool moves in the −Z direction from the operation screen on which the button B is displayed is determined as the third operation. That is, when an operation in which the operation tool moves in the −Z direction by more than a predetermined distance from the operation screen on which the button B is displayed is performed, the VR device controller 21 determines that the button B is not operated. In this embodiment, since a virtual image is used, and the user does not acquire the feeling that the operation tool touches the screen, even when the operation tool penetrates the button B to some extent, it should not be determined that the button B is not operated immediately. For this reason, it is not determined, simply by the fact that the operation in which the operation tool moves in the −Z direction within a predetermined distance from the operation screen on which the button B is displayed is performed, that the button B is not operated, but the next operation is waited for. When the operation tool moves in the −Z direction by more than the predetermined distance, it is determined that the button B is operated.

As described above, according to the present embodiment, even when the VR device 2 is used, the same operations and effects as the above embodiments can be achieved.

In the above, the three embodiments have been shown. Regardless of the operation panel 12 or the VR headset 22 shown here, the above embodiments can be applied to a scanner, a personal computer, or the like as long as it is an electronic device equipped with a detection device capable of detecting button operations.

Further, a method of executing each process of the printing apparatus 1 and the VR device 2 shown in each of the above-described embodiments and modifications, a program for executing each process of the printing apparatus 1 and the VR device 2, and a recorded computer-readable recording medium storing the program is also included in the scope of the disclosure. Moreover, the configuration may be a combination of the respective embodiments and the respective modifications. In addition, the processes of the printing apparatus 1 and the VR device 2 such as the processes performed with the cooperation of hardware and software can be appropriately changed without departing from the gist of the disclosure, for example.

APPENDIX

Hereinafter, an electronic device and a program will be additionally described. The printing apparatus 1 includes the display 12a that displays the button B and the printing apparatus controller 11 that determines that according to a second operation in which an operation tool leaves the button B being operated following a first operation in which the operation tool moves toward the button B, the button B is operated, and determines that according to a third operation in which the operation tool leaves the button B being operated following the first operation, the button B is not operated, and the printing apparatus controller 11 makes a decision of the criterion for determining the second operation and the third operation according to the operation description before the first operation.

A non-transitory computer-readable storage medium stores a program. The program causes an electronic device to execute a method. The method includes determining, according to an operation description before a first operation in which an operation tool moves to a button, whether a second operation in which the operation tool leaves the button is operated following the first operation, or whether a third operation in which the operation tool leaves the button is operated following the first operation, determining that the button is operated according to the second operation being performed following the first operation, and determining that the button is not operated according to the third operation being performed following the first operation.

According to this configuration, since the printing apparatus 1 makes a decision of the criterion for determining a second operation in which it is determined that the button B is operated, and a third operation in which it is determined that the button B is not operated according to the operation description before the first operation, it is possible to appropriately make a determination of the user's button operation.

In the printing apparatus 1 described above, the second operation is an operation in which the operation tool moves from the sensing area Es including the in-button area E10, which is the area in the button B toward the direction in which the user is present. The printing apparatus controller 11 preferably decides the size of the sensing area Es according to the operation description before the first operation.

According to this configuration, when the operation of moving the operation tool from the sensing area Es toward the direction in which the user is present is performed, the printing apparatus 1 can determine that the button B is operated, and can decide the sensing area Es to an appropriate size according to the operation description before the first operation.

In the printing apparatus 1 described above, the printing apparatus controller 11 preferably decides the size of the sensing area Es so that the size of the sensing area Es when the first operation is an operation in which the operation tool moves toward the in-button end area E12 which is an area that is the in-button area E10 which is outside the in-button central area E11, where the in-button central area E11 is the central area of the in-button area E10, is larger than that when the first operation is an operation in which the operation tool moves toward the in-button central area E11.

According to this configuration, since the size of the sensing area Es when the first operation is an operation in which the operation tool moves toward the in-button end area E12 which is an area that is the in-button area E10 which is outside the in-button central area E11, where the in-button central area E11 is the central area of the in-button area E10, is larger than that when the first operation is an operation in which the operation tool moves toward the in-button central area E11, the printing apparatus 1 can determine that the button B is operated even when the position of the operation tool is shifted from the in-button end area E12 against the user's intention.

In the printing apparatus 1, it is preferable that the second operation and the third operation include operations in which directions in which the operation tool leaves the button are different from.

According to this configuration, the printing apparatus 1 can determine whether the button B is operated according to the direction in which the operation tool leaves the button B.

In the printing apparatus 1 described above, it is preferable that the second operation include an operation in which the operation tool moves to the direction in which the user is present from the in-button area which is the area inside the button, and the third operation include an operation in which the operation tool moves in the direction orthogonal to the direction in which the user is present from the in-button area.

According to this configuration, the printing apparatus 1 can determines whether the button B is operated depending on whether the operation tool moves to the direction in which the user is present from the in-button area E10 or the operation tool moves in the direction orthogonal to the direction in which the user is present from the in-button area E10.

In the printing apparatus 1 described above, the printing apparatus controller 11 preferably decides that when the first operation is an operation in which the operation tool moves toward the sensing area Es including the in-button area E10 which is an area in the button B from the direction in which the user is present, an operation in which the operation tool moves toward the direction in which the user is present from the in-button area E10 is the second operation, and when the first operation is an operation in which the operation tool moves toward an area outside the sensing area Es from the direction in which the user is present, an operation in which the operation tool moves toward the direction in which the user is present from the in-button area E10 is the third operation.

According to this configuration, the printing apparatus 1 decides that when the first operation is an operation in which the operation tool moves toward the sensing area Es from the direction in which the user is present, an operation in which the operation tool moves toward the direction in which the user is present from the in-button area E10 is the second operation, and when the first operation is an operation in which the operation tool moves toward an area outside the sensing area Es from the direction in which the user is present, an operation in which the operation tool moves toward the direction in which the user is present from the in-button area E10 is the third operation. For this reason, even when the user unintentionally touches a position slightly off the button B, it can be determined, by shifting the touch position to the in-button area E10, that the button B is operated.

In the printing apparatus 1, it is preferable that the printing apparatus controller 11 decide the size of the sensing area Es according to the operation description before the first operation.

According to this configuration, the printing apparatus 1 can decide the sensing area Es to an appropriate size according to the operation description before the first operation.

What is claimed is:

1. An electronic device comprising:
    a display unit that displays a button; and
    a processor configured to:
        determine that a button is operated according to a first operation, in which an operation tool moves toward the button, and a second operation, in which the operation tool leaves the button after the first operation;
        determine that the button is not operated according to the first operation and a third operation, in which the operation tool leaves the button after the first operation;
        determine a sensing area on the display unit, which is an area different from an area where the button is displayed, based on a relative approaching position of the first operation relative to the button; and
        decide whether the operation tool performs the second operation or the third operation based on a relative leaving position of the operation tool relative to the sensing area.

2. The electronic device according to claim 1, wherein:
    the second operation is an operation in which the operation tool moves toward a direction in which a user is present from the sensing area including an in-button area which is an area in the button, and
    the processor decides a size of the sensing area according to an operation description before the first operation.

3. The electronic device according to claim 2, wherein the processor decides the size of the sensing area so that a size of the sensing area when the first operation is an operation in which the operation tool moves toward an in-button end area that is the in-button area which is an area outside an in-button central area, the in-button central area being a central area of the in-button area, is larger than a size of the sensing area when the first operation is an operation in which the operation tool moves toward the in-button central area.

4. The electronic device according to claim 1, wherein the second operation and the third operation include operations in which directions in which the operation tool leave the button are different.

5. The electronic device according to claim 4, wherein the second operation includes an operation in which the operation tool moves from an in-button area which is an area in the button to a direction in which a user is present, and the third operation includes an operation in which the operation tool moves from the in-button area in a direction orthogonal to the direction in which the user is present.

6. The electronic device according to claim 1, wherein the processor is further configured to:
    decide that when the first operation is an operation in which the operation tool moves toward the sensing area including an in-button area which is an area in the button from a direction in which a user is present, an operation in which the operation tool moves toward the direction in which the user is present from the in-button area is the second operation, and
    decide that when the first operation is an operation in which the operation tool moves toward an area outside the sensing area from the direction in which the user is present, an operation in which the operation tool moves toward the direction in which the user is present from the in-button area is the third operation.

7. The electronic device according to claim 6, wherein the processor is further configured to decide a size of the sensing area according to an operation description before the first operation.

8. A non-transitory computer-readable storage medium storing a program, the program causing an electronic device to execute a method, the method comprising:
    determining, according to an operation description before a first operation in which an operation tool moves to a button, whether a second operation in which the operation tool leaves the button is operated following the first operation, or whether a third operation in which the operation tool leaves the button is operated following the first operation;
    determining a sensing area, which is an area different from an area where the button is, based on a relative approaching position of the first operation relative to the button; and
    deciding whether the operation tool performs the second operation or the third operation based on a relative leaving position of the operation tool relative to the sensing area.

* * * * *